US012566705B2

(12) United States Patent
You

(10) Patent No.: US 12,566,705 B2
(45) Date of Patent: Mar. 3, 2026

(54) SYSTEM ON CHIP, A COMPUTING SYSTEM, AND A STASHING METHOD

(71) Applicant: SAMSUNG ELECTRONICS CO., LTD., Suwon-si (KR)

(72) Inventor: Daecheol You, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 18/388,877

(22) Filed: Nov. 13, 2023

(65) Prior Publication Data

US 2024/0419598 A1 Dec. 19, 2024

(30) Foreign Application Priority Data

Jun. 14, 2023 (KR) ......................... 10-2023-0076407

(51) Int. Cl.
*G06F 12/084* (2016.01)
(52) U.S. Cl.
CPC ................................. *G06F 12/084* (2013.01)
(58) Field of Classification Search
CPC ........................... G06F 12/084; G06F 12/0815
See application file for complete search history.

(56) References Cited

U.S. PATENT DOCUMENTS

| | | | |
|---|---|---|---|
| 7,774,522 B2 | 8/2010 | Bouvier | |
| 8,037,280 B2 | 10/2011 | Pandey et al. | |
| 8,732,386 B2 | 5/2014 | O'Krafka et al. | |
| 9,152,468 B2 | 10/2015 | Waddington et al. | |

| | | | |
|---|---|---|---|
| 9,170,954 B2 | 10/2015 | Muff et al. | |
| 9,886,313 B2 | 2/2018 | Wagle et al. | |
| 10,725,824 B2 | 7/2020 | Lowery et al. | |
| 11,263,137 B2 | 3/2022 | Joao et al. | |
| 11,422,944 B2 | 8/2022 | Guo et al. | |
| 11,445,020 B2 | 9/2022 | Beard et al. | |
| 2006/0248287 A1 | 11/2006 | Buyuktosunoglu et al. | |
| 2009/0240869 A1 | 9/2009 | O'Krafka et al. | |
| 2009/0313445 A1 | 12/2009 | Pandey et al. | |
| 2010/0125677 A1 | 5/2010 | Bouvier | |
| 2012/0102500 A1 | 4/2012 | Waddington et al. | |
| 2014/0040557 A1* | 2/2014 | Frey | G06F 9/467 |
| | | | 711/150 |
| 2014/0164732 A1 | 6/2014 | Muff et al. | |
| 2015/0254182 A1* | 9/2015 | Asher | G06F 12/0815 |
| | | | 711/135 |
| 2016/0371194 A1 | 12/2016 | Wagle et al. | |
| 2018/0203734 A1 | 7/2018 | Lowery et al. | |
| 2020/0371953 A1 | 11/2020 | Guo et al. | |
| 2021/0306414 A1 | 9/2021 | Beard et al. | |
| 2021/0374059 A1* | 12/2021 | Joao | G06F 12/0895 |
| 2022/0066831 A1 | 3/2022 | Gates et al. | |
| 2022/0327009 A1 | 10/2022 | Beard et al. | |

OTHER PUBLICATIONS

European Search Report dated May 8, 2024, of the corresponding European Patent Application No. 23215993.9.

* cited by examiner

*Primary Examiner* — Kenneth M Lo
*Assistant Examiner* — Jonah C Krieger
(74) *Attorney, Agent, or Firm* — MORGAN, LEWIS & BOCKIUS LLP

(57) ABSTRACT

A system on chip including: a plurality of processors; a system level cache memory that is shared by the plurality of processors; and a cache controller that transmits first data to another chip if an atomic operation has been performed on the first data, when the system level cache memory receives the first data from at least one of the plurality of processors.

18 Claims, 17 Drawing Sheets

FIG. 7

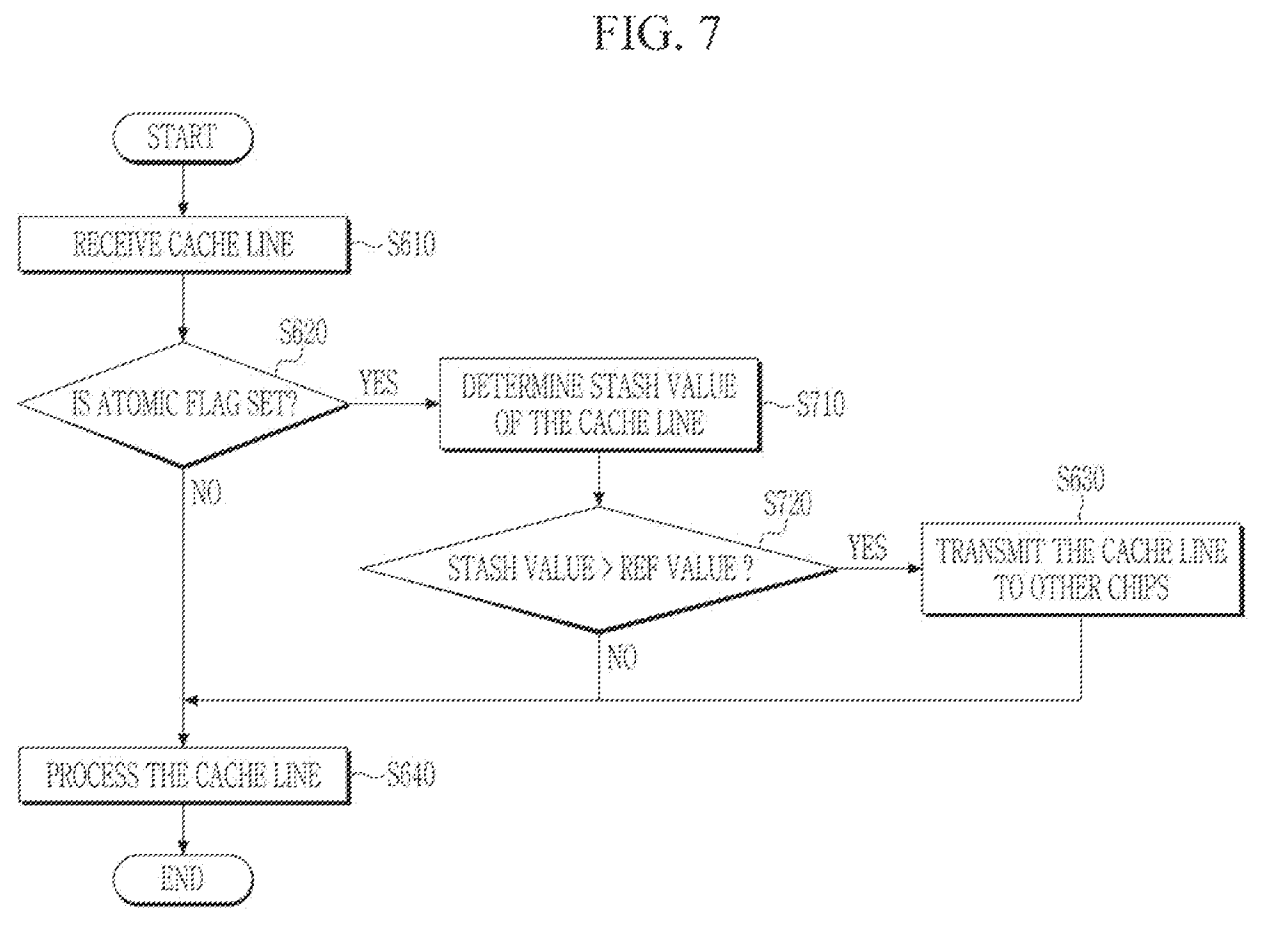

START

RECEIVE CACHE LINE — S810

IS ATOMIC FLAG SET? — S820

YES

DETERMINE STASH VALUE OF THE CACHE LINE — S710

STASH VALUE > REF VALUE ? — S720

YES

TRANSMIT THE CACHE LINE TO OTHER CHIPS — S630

NO

NO

PROCESS THE CACHE LINE — S840

END

1000

| ADDRESS | STASH VALUE |
|---------|-------------|
| ADDR_1  | STV_1       |
| ADDR_2  | STV_2       |
| ⋮       | ⋮           |
| ADDR_T  | STV_T       |

SYSTEM ON CHIP, A COMPUTING SYSTEM, AND A STASHING METHOD

CROSS-REFERENCE TO RELATED APPLICATION

This application claims priority under 35 U.S.C. § 119 to Korean Patent Application No. 10-2023-0076407 filed in the Korean Intellectual Property Office on Jun. 14, 2023, the disclosure of which is incorporated by reference herein in its entirety.

(a) TECHNICAL FIELD

The present disclosure relates to a system on chip, a computing system, and a stashing method.

(b) DESCRIPTION OF THE RELATED ART

Multi-chip computing systems may be implemented using various architectures. Two common architectures for these systems are uniform memory access (UMA) and non-uniform memory access (NUMA). In UMA systems, multiple chips access a single memory through buses, and all of these chips have equal access rates to the memory. However, as the number of chips increases, potential bottlenecks can arise, leading to reduced memory access performance. In NUMA systems, chips have their own internal memories. These internal memories are interconnected through a network, allowing each chip to access not only its own memory but also the memories of other chips.

In NUMA systems, a chip's memory access rate can vary based on the location of the targeted memory. For example, accessing an external memory might be slower than accessing its own internal memory, potentially reducing overall memory access performance. Further, as the number of chips in a NUMA system increases, these differences in access rates may occur more frequently, leading to further performance degradation.

SUMMARY

The present disclosure provides a system on chip, a computing system, and a stashing method that can reduce read latency when a chip in a non-uniform memory access (NUMA) system accesses shared data in another chip.

An embodiment of the present disclosure provides, a system on chip that includes: a plurality of processors; a system level cache memory that is shared by the plurality of processors; and a cache controller that transmits first data to another chip if an atomic operation has been performed on the first data, when the system level cache memory receives the first data from at least one of the plurality of processors.

An embodiment of the present disclosure provides, a computing system including: a first chip that transmits first data to a second chip when an atomic operation has been performed on the first data; and the second chip that shares the first data with the first chip, and transmits information on whether the first data has been read, to the first chip, in response to the receipt of the first data.

An embodiment of the present disclosure provides, a stashing method of a system on chip including: acquiring an address of a cache line subjected to an atomic operation; incrementing a stash value when the cache line has been read by other system on chips, and decrementing the stash value when the cache line has not been read by the other system on chips; and determining whether to stash the cache line based on the address and the stash value.

BRIEF DESCRIPTION OF THE DRAWINGS

FIG. 7 is a flowchart for explaining a cache line processing method which is performed by a system level cache according to an embodiment of the present disclosure.

DETAILED DESCRIPTION OF THE EMBODIMENTS

Figure 1:
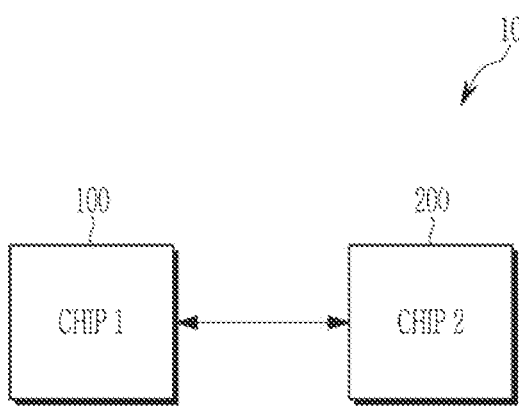
FIG. 1 is a schematic block diagram of a multi-chip computing system according to an embodiment of the present disclosure.

In this specification, only certain embodiments of the present disclosure are shown and described. As those skilled in the art would realize, the described embodiments may be modified in various different ways, without departing from the spirit or scope of the present disclosure.

Accordingly, the drawings and this description are to be regarded as illustrative in nature and not restrictive. Like reference numerals may designate like elements throughout the specification. In the flowcharts described with reference to the drawings, the order of operations may be changed, several operations may be combined, an operation may be divided, and some operations may not be performed.

Further, expressions written in singular forms can be interpreted as the singular forms or plural forms unless clear expressions such as "a", "an", or "single" are used. Terms including an ordinal number, such as first and second, are used to describe various constituent elements, but the constituent elements are not limited by the terms. For example, these terms are used to discriminate one constituent element from other constituent elements.

FIG. 1 is a schematic block diagram of a multi-chip computing system according to an embodiment of the present disclosure.

Referring to FIG. 1, a computing system 10 according to an embodiment may be a multi-chip computing system. For example, the computing system 10 may include a first chip 100 and a second chip 200. The first chip 100 and the second chip 200 are multi-processor chips, and may be system on chips (SOCs). However, the present embodiment is not necessarily limited thereto, and at least one of the first chip 100 and the second chip 200 may be implemented as a single processor chip.

The computing system 10 may be disposed and operate in an electronic device. The electronic device may be implemented as a personal computer (PC), a data server, a laptop computer, an automotive electronic component, or a portable device. The portable device may be implemented as a mobile phone, a smart phone, a tablet PC, a wearable device, a personal digital assistant (PDA), an enterprise digital assistant (EDA), an image processing device equipped with an image sensor, a digital still camera, a digital video camera, a portable multimedia player (PMP), a personal navigation device or portable navigation device (PND), a handheld game console, or an e-book.

The first chip 100 and the second chip 200 may share data. Data which is shared by the first chip 100 and the second chip 200 may be arguments for synchronizing execution between threads in a situation such as parallel computation. In other words, in parallel computation, data shared between the first chip 100 and the second chip 200 can serve as arguments to synchronize thread execution. Examples of arguments for synchronizing may include a lock argument, which ensures mutual exclusion of other threads, a condition variable argument, which keeps a thread in a wait state based on a logical condition, a barrier argument, which requires all threads to wait until a specific execution time point, etc.

The first chip 100 and the second chip 200 may share a first data and a second data. In this case, the first chip 100 may manage the first data, and the second chip 200 may manage the second data. In other words, the first chip 100 may be the home node of the first data and a remote node of the second data. The second chip 200 may be a remote node of the first data and the home node of the second data. The latency which is required for the second chip 200 to access the first data may be longer than the latency which is required for the first chip 100 to access the first data. Similarly, the latency which is required for the first chip 100 to access the second data may be longer than the latency which is required for the second chip 200 to access the second data. As the remote nodes access the data in the home node more frequently, the performance of the computing system 10 may decrease. The computing system 10 may be a non-uniform memory access (NUMA) system.

The first chip 100 may transmit the first data to the second chip 200 which is a remote node, in advance. The act of the first chip 100 transmitting the first data in advance may be referred to as a stash operation. The first chip 100 may determine a stash value for the first data, and determine whether to transmit the first data in advance, on the basis of the stash value.

The first chip 100 may determine a stash value on the basis of a feedback response from the second chip 200. The first chip 100 may transmit the first data to the second chip 200, and the second chip 200 may transmit positive feedback or negative feedback to the first chip 100 in response to the first data. Further, in the case where the first chip 100 does not transmit the first data to the second chip 200, the first chip 100 may update the stash value depending on whether a read request for the first data has been received from the second chip 200, or not. The first chip 100 may transmit the first data in advance, thereby reducing the latency which is required for the second chip 200 to access the first data.

In the present embodiment, the first chip 100 which is a home node may update the first data. Based on a stash value for the updated first data, the first chip 100 may determine whether to transmit the updated first data to the second chip 200. According to the determination, the first chip 100 may or may not transmit the updated first data to the second chip 200.

In the present embodiment, the second chip 200 which is a remote node may update the first data. In other words, the second chip 200 may have received the first data from the first chip 100 prior to the update of the first data. The second chip 200 may transmit the updated first data to the first chip 100. In the case where the computing system 10 further includes a chip other than the first chip 100 and the second chip 200, the first chip 100 may determine whether to transmit the updated first data to the other chip, which is a remote node, based on the stash value for the updated first data. According to the determination, the first chip 100 may or may not transmit the updated first data to the other chip.

Figure 2:
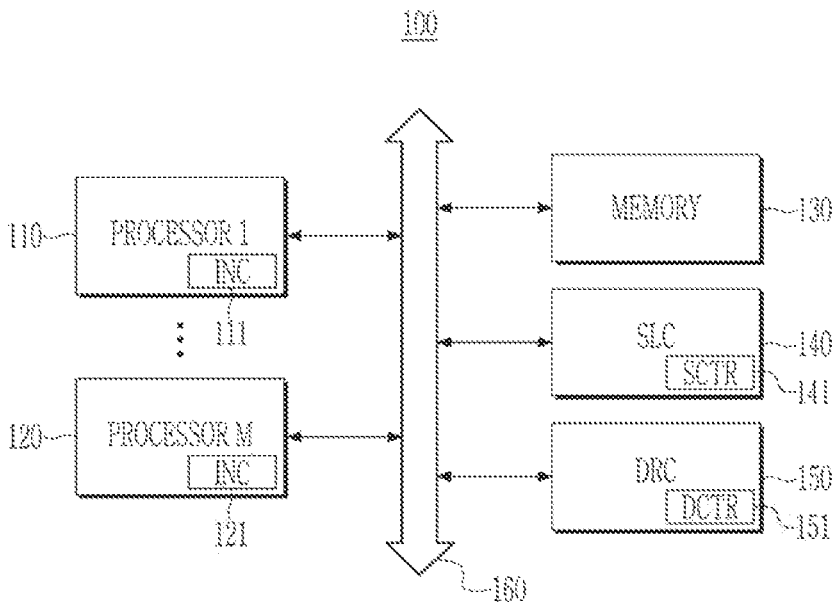
FIG. 2 is a block diagram of a first chip according to the embodiment of FIG. 1.
Figure 3:
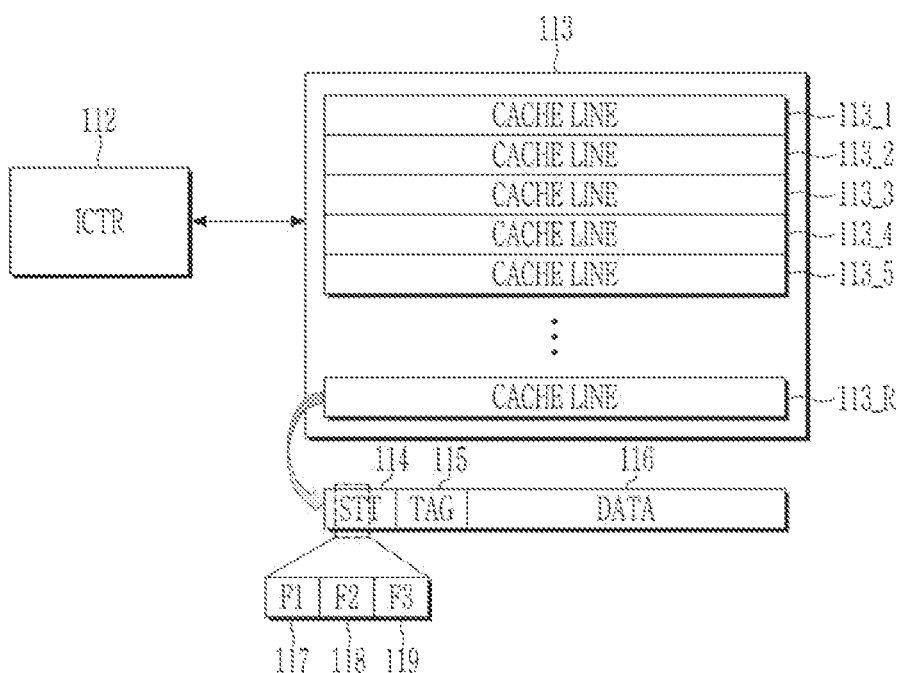
FIG. 3 is a drawing for explaining internal caches according to the embodiment of FIG. 1.
Figure 4:
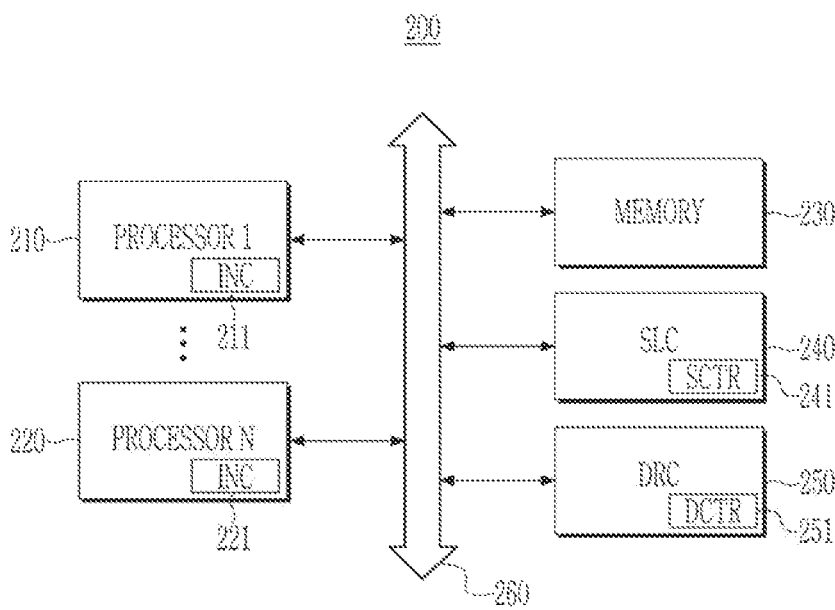
FIG. 4 is a block diagram of a second chip according to the embodiment of FIG. 1.

FIG. 2 is a block diagram of the first chip according to the embodiment of FIG. 1, and FIG. 3 is a drawing for explaining an internal cache according to the embodiment of FIG. 1, and FIG. 4 is a block diagram of the second chip according to the embodiment of FIG. 1.

Referring to FIG. 2, the first chip 100 may include a plurality of processors 110 and 120, a memory 130, a system level cache (SLC) 140, and a directory cache (DRC) 150. The plurality of processors 110 and 120, the memory 130, the system level cache 140, and the directory cache 150 may perform communication with one another through a bus 160, and perform communication with other chips. In other words, the bus 160 may function as an interface for supporting communication between the components.

The plurality of processors 110 and 120 may be central processing units (CPUs), graphic processing units (GPUs), neural processing units (NPUs), microprocessors, application processors (APs), etc. The plurality of processors 110 and 120 may include first to M-th processors, wherein M is an integer greater than 1. According to the present embodiment, the first processor 110 and the M-th processor 120 may be implemented as different processing units. The plurality of processors 110 and 120 may be single-core processors or may be multi-core processors.

The memory 130 may store data which is used in the first chip 100. The memory 130 may be a volatile memory such as a dynamic random access memory (DRAM), and/or a non-volatile memory such as a flash memory. For example, the memory 130 may be configured with DRAMs, phase-change random access memories (PRAMs), magnetic random access memories (MRAMs), resistive random access memories (ReRAMs), ferroelectric random access memories (FRAMs), spin transfer torque RAMs (STT-RAMs), conductive bridging RAMs (CBRAMs), NOR flash memories, NAND flash memories, vertical NAND flash memories, bonding vertical NAND (BVNAND) flash memories, fusion flash memories (such as a memory in which an SRAM (static random access memory) buffer, a NAND flash memory, and a NOR interface logic are combined), etc. The plurality of processors 110 and 120 may access data in the memory 130, and perform operations based on the data. The first chip 100 may further include a memory controller for controlling the memory 130 in response to instructions from the plurality of processors 110 and 120. In some embodiments, the memory controller may be disposed inside the memory 130.

The plurality of processors 110 and 120 may include internal caches (INCs) 111 and 121. The internal caches 111 and 121 may include cache hierarchy structures, each of which consists of two or more cache levels. For example, the internal caches 111 and 121 may include level 1 (L1) caches, level 2 (L2) caches, etc. Here, the sizes of the L2 caches may be larger than the sizes of the L1 caches. In the internal caches 111 and 121, data of the memory 130, the system level cache 140, or the directory cache 150 may be cached. The internal caches 111 and 121 may be dedicated caches which are used by the processors 110 and 120, respectively, and the system level cache 140 and the directory cache 150 may be shared caches which are used in common by the plurality of processors 110 and 120. The internal cache 121 may have the same structure as that of the internal cache 111. In other words, the internal cache 121 may include a cache controller and a plurality of cache lines.

Referring to FIG. 3, in the internal cache 111, the L1 cache may include a cache controller (ICTR) 112 and a plurality of cache lines 113. The plurality of cache lines 113 may include first to R-th cache lines 113_1 to 113_R. Here, R is an integer greater than 1, and may be determined based on the size of the L1 cache, in advance.

The cache controller 112 may control the plurality of cache lines 113 in response to instructions from the first processor 110. For example, the cache controller 112 may perform read transactions, write transactions, and so on, on the plurality of cache lines 113. In the case of a read transaction, the cache controller 112 may output data of a cache line (for example, the first cache line 113_1). In the case of a write transaction, the cache controller 112 may write data in a cache line (for example, the second cache line 113_2). When the cache controller 112 successfully performs a read transaction or a write transaction, the cache controller 112 may set a flag in a cache line (for example, the R-th cache line 113_R). For example, the cache controller 112 may store a bit (for example, '1') in the field of the R-th cache line 113_R.

The cache controller 112 may check an atomic load and an atomic store for the data consistency of a write transaction. In other words, the cache controller 112 may verify data consistency of a write transaction by checking both atomic load and atomic store operations. With respect to an atomic load, the cache controller 112 may set an exclusive flag in the field of the cache lines 113 when the first processor 110 reads data of the cache lines 113. In the case where an atomic store is performed after a read operation of the first processor 110, the exclusive flag set in the cache lines 113 may be used to determine the success or failure of the atomic store.

An atomic store may refer to the operation of the first processor 110 performing an atomic update on the data of the cache lines 113. If the first processor 110 performs an atomic store, the cache controller 112 may check the value of the exclusive flag, and determine that the atomic store has succeeded, when the exclusive flag has been set. The cache controller 112 may set an atomic flag when an atomic store succeeds. The cache controller 112 may clear (or reset) the exclusive flag when an atomic store succeeds.

The cache controller 112 may check a read-hit flag for a cache line on which a read transaction has occurred. The read-hit flag may be used to check whether the data of the cache line has been actually read. For example, the first chip 100 may receive data whose home node is the second chip 200, from the second chip 200. If the first processor 110 reads the data received from the second chip 200, the cache controller 112 may set a read-hit flag. If the first processor 110 does not read the data of the second chip 200 until the data of the second chip 200 is invalidated or evicted, the cache controller 112 may set a read-not-hit flag.

The plurality of cache lines 113 may include state fields (STT) 114, tag fields (TAG) 115, and data fields (DATA) 116. The state fields 114 may include information on features of data, etc. Information on features of data may include an exclusive flag, an atomic flag, a read-hit flag, a read-not-hit flag, etc. Each state field 114 may consist of a plurality of fields including first to third fields (F1, F2 and F3) 117, 118 and 119. For example, the first field 117 may store an atomic flag, and the second field 118 may store a read-hit flag, and the third field 119 may store a read-not-hit flag. However, the structure of the plurality of cache lines 113 is not limited to that shown in FIG. 3, and the number of fields, their locations, and so on may be changed. For example, the order of the first to third fields 117 to 119 may be implemented differently, and the state field 114 may be implemented to be disposed between the tag field 115 and the data field 116.

The tag field 115 may include information on a memory address at which data is stored in the memory 130. The data field 116 may store data corresponding to the memory address.

The cache controller 112 may set an atomic flag in the first field 117 if an atomic operation is performed on the data in the data field 116 by the first processor 110. In other words, the cache controller 112 may set an atomic flag if an atomic load and an atomic store are successfully performed by the first processor 110. According to the present embodiment, if an atomic load is performed on the data in the data field 116 by the first processor 110, the cache controller 112 may set an exclusive flag in one field of the state field 114. The cache controller 112 may store and manage the address of the cache line 113_R subjected to the atomic load, in an address monitor. The cache controller 112 may reset (or unset) the exclusive flag when its receives an invalidation message. For example, the second chip 200 may perform an atomic store on the data, and transmit an invalidation message to the first chip 100. For data consistency, the first chip 100 and the second chip 200 should not simultaneously perform atomic stores on a piece of data. In other words, to ensure data consistency, the first chip 100 and the second chip 200 should not concurrently execute atomic stores on the same data. For this reason, the cache controller 112 may reset the exclusive flag in the first field 117 in response to an invalidation message. Accordingly, when the first processor 110 thereafter performs an atomic store on the data, the corresponding atomic store may fail. In other words, when the exclusive flag in the first field 117 is reset, the first processor 110 may fail to perform the atomic store on the data. When the exclusive flag is set in the first field 117, the first processor 110 may successfully perform the atomic store on the data. When the first processor 110 successfully performs the atomic store, the cache controller 112 may reset the exclusive flag and set an atomic flag.

When the data is read by the first processor 110, the cache controller 112 may set the read-hit flag in the second field 118. For example, the second chip 200 may transmit the data whose home node is the second chip 200, to the first chip 100, even though the first chip 100 has not requested the data. If the first processor 110 reads the received data, the cache controller 112 may set the read-hit flag in the second field 118, and transmit information about the cache line where the read-hit flag has been set, to the second chip 200.

When the data has not been read by the first processor 110, the cache controller 112 may set the read-not-hit flag in the third field 119. For example, the second chip 200 may transmit the data whose home node is the second chip 200, to the first chip 100, even though the first chip 100 has not requested the data. If the first processor 110 does not read the received data, the cache controller 112 may set the read-not-hit flag in the third field 119, and transmit information about the cache line where the read-not-hit flag has been set, to the second chip 200. For example, when the data of the second chip 200 is not read until the data of the second chip 200 is evicted, or until an invalidation message is received from the second chip 200, the cache controller 112 may set the read-not-hit flag for the data of the second chip 200.

When all of the plurality of indexed cache lines 113 contain data, the cache controller 112 may evict the cache line 113_R according to a cache replacement policy. For example, the cache replacement policy may include a policy of randomly replacing cache lines, a policy of replacing the cache line that has not been used for the longest time, a policy of replacing the earliest stored cache line, or a policy of replacing the cache line that has been accessed the least number of times.

The cache controller 112 may transmit the cache line 113_R to the system level cache 140 when the data of the cache line 113_R is the data of the home node, and transmit the cache line 113_R to the directory cache 150 when the data of the cache line 113_R is the data of the remote node. When the data of the cache line 113_R is the data of the home node, it may mean that the data is contained in the address area of the home node. Additionally, when the data of the cache line 113_R is the data of the remote node, it may mean that the data is contained in the address area of the remote node. Referring to FIG. 2 to FIG. 4, the first chip 100 and the second chip 200 may share the first data and the second data, and the cache controller 112 may determine the first data as the data of the home node, and determine the second data as the data of the remote node. The cache controller 112 may transmit the first data to the system level cache 140 based on the cache replacement policy. The cache controller 112 may transmit the second data to the directory cache 150 based on the cache replacement policy. The operation of the cache controller 112 transmitting the cache line 113_R to the system level cache 140 or the directory cache 150 is referred to as a data eviction operation. Here, the cache controller 112 may transmit the data of the cache line 113_R to the system level cache 140 or the directory cache 150 through the L1 cache and the L2 cache.

The system level cache 140 may be involved in the first data whose home node is the first chip 100, and may not be involved in the second data whose remote node is the first chip 100. For example, the system level cache 140 may receive the first data from the internal caches 111 and 121 of the first chip 100 or the directory cache of the second chip 200. The configuration in which the directory cache of the second chip 200 transmits the first data to the system level cache 140 will be described below with reference to FIG. 14. The system level cache 140 may include an SLC controller (SCTR) 141 for controlling the operation of the system level cache 140.

The SLC controller 141 may determine a stash value for the first data. For example, the SLC controller 141 may determine '0' as an initial stash value for the first data. In some embodiments, the SLC controller 141 may determine a stash value for the first data based on the feedback response of the second chip 200 related to the first data. The SLC controller 141 may include a counter for each cache line. The counter may increment or decrement the stash value based on a feedback response. The SLC controller 141 may determine '0' as the initial stash value for the first data.

The SLC controller 141 may maintain or increment the stash value when receiving positive feedback from the second chip 200. Positive feedback may be a response indicating that the operation of the first chip 100 transmitting the first data to the second chip 200 in advance was correct. For example, when the first chip 100 transmits the first data to the second chip 200, and the second chip 200 transmits information indicating that it has read the first data, to the first chip 100, the first chip 100 may maintain or increment the stash value for the first data. When the second chip 200 reads the first data, it may set the read-hit flag in the state field of the first data. The second chip 200 may transmit the read-hit flag to the first chip 100 by evicting the first data to the first chip 100. Alternatively, the first chip 100 may receive a write request from another chip, and transmit an invalidation message to the second chip 200. The second chip 200 may transmit the read-hit flag to the first chip 100 in response to the invalidation message.

Further, when the first chip 100 has not transmitted the first data to the second chip 200, and the second chip 200 transmits a signal requesting the first data to the first chip 100, the first chip 100 may increment the stash value for the first data.

When the SLC controller 141 receives negative feedback from the second chip 200, it may maintain or decrement the stash value. Negative feedback may be a response indicating that the operation of the first chip 100 transmitting the first data to the second chip 200 in advance was incorrect. For example, when the first chip 100 has transmitted the first data to the second chip 200, but the second chip 200 does not read the first data, the first chip 100 may decrement the stash value for the first data. In an embodiment, the second chip 200 may evict the first data to the first chip 100 without reading the first data. This may correspond to a weak negative feedback. The second chip 200 may set the read-not-hit flag in the state field of the first data, and evict the first data to the first chip 100. If the read-not-hit flag is in the state field, the first chip 100 may decrement the stash value by a first value. The first chip 100 may decrement the stash value by the first value when receiving read-not-hit flags from all chips sharing the first data. In other words, when the first chip 100 receives a read-not-hit flag from the second chip 200, and receives positive feedback from another chip, it may maintain or increment the existing stash value instead of decrementing the stash value.

In an embodiment, the second chip 200 may receive an invalidation message without reading the first data. In response to the invalidation message, the second chip 200 may transmit a signal including a read-not-hit flag to the first chip 100. This may correspond to strong negative feedback. In response to the signal including the read-not-hit flag, the first chip 100 may decrement the stash value by a second value. Here, the second value may be greater than the first value. Alternatively, the first chip 100 may reset the stash value.

Further, when the first chip 100 has transmitted the first data to the second chip 200, but the second chip 200 transmits a write request to the first chip 100, the first chip 100 may decrement the stash value for the first data. Furthermore, when the first chip 100 has not transmitted the first data to the second chip 200, and the second chip 200 has not transmitted a signal requesting the first data, the first chip 100 may maintain or decrement the stash value for the first data.

The SLC controller 141 may determine whether to transmit the first data to the second chip 200, on the basis of the stash value. In an embodiment, the SLC controller 141 may not transmit the first data to the second chip 200 when the stash value is a third value, and may transmit the first data to the second chip 200 when the stash value is a fourth value. In an embodiment, the SLC controller 141 may not transmit the first data to the second chip 200 when the stash value is smaller than a fifth value, and may transmit the first data to the second chip 200 when the stash value is equal to or greater than the fifth value.

The directory cache 150 may receive the second data from the second chip 200, and update the second data, and transmit the updated second data to the second chip 200. The directory cache 150 may be involved in the second data whose remote node is the first chip 100, and may not be involved in the first data whose home node is the first chip 100. In other words, the directory cache 150 may process data having remote addresses.

The directory cache 150 may include a DRC controller (DCTR) 151 for controlling the operation of the directory cache 150. The DRC controller 151 may transmit the second data processed by the plurality of processors 110 and 120 to the second chip 200, and provide the second data received from the second chip 200, to the plurality of processors 110 and 120.

The second chip 200 according to the present embodiment may include a plurality of processors 210 and 220, a memory 230, a system level cache (SLC) 240, and a directory cache (DRC) 250. The plurality of processors 210 and 220, the memory 230, the system level cache 240, and the directory cache 250 may perform communication with one another through a bus 260, and perform communication with other chips. The plurality of processors 210 and 220 may include first to N-th processors, wherein N is an integer greater than 1. The description of the plurality of processors 110 and 120, the memory 130, the system level cache 140, and the directory cache 150 of the first chip 100 in FIG. 2 may be equally applied to the plurality of processors 210 and 220, the memory 230, the system level cache 240, the directory cache 250 of the second chip 200 in FIG. 4. The system level cache 240 may include an SLC controller 241 and the directory cache 250 may include a DRC controller 251. Hereinafter, redundancies will be omitted.

The system level cache 240 may be involved in the second data whose home node is the second chip 200, and may not be involved in the first data whose remote node is the second chip 200. The system level cache 240 may receive the second data from internal caches 211 and 221 of the plurality of processors 210 and 220. The internal caches 211 and 221 may transmit the second data to the system level cache 240 based on the cache replacement policy. The system level cache 240 may receive the second data from the directory cache 150 of the first chip 100.

The system level cache 240 may determine a stash value for the second data. For example, the system level cache 240 may determine a stash value for the second data based on a feedback response from the first chip 100. The configuration in which the system level cache 240 determines a stash value for the second data may be substantially the same as the configuration in which the system level cache 140 determines a stash value for the first data.

The directory cache 250 may be involved in the first data whose remote node is the second chip 200, and may not be involved in the second data whose home node is the second chip 200. The directory cache 250 may receive the first data from the system level cache 140 of the first chip 100. The directory cache 250 may receive the first data from the internal caches 211 and 221 of the plurality of processors 210 and 220. The internal caches 211 and 221 may transmit the first data to the directory cache 250 based on the cache replacement policy.

Figure 5:
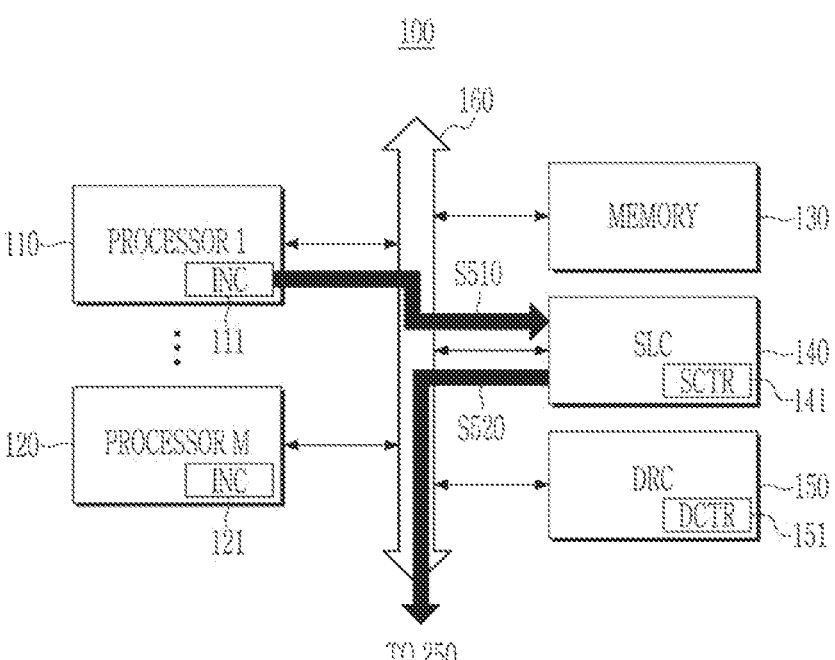
FIG. 5 is a drawing for explaining the operation of the first chip according to the embodiment of FIG. 1.
Figure 6:
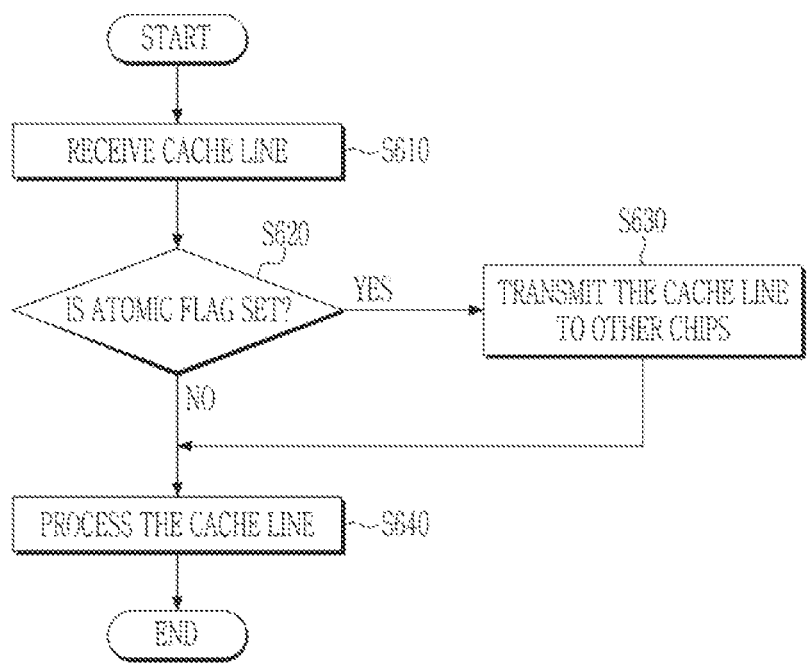
FIG. 6 is a flowchart for explaining a cache line processing method which is performed by a system level cache according to an embodiment of the present disclosure.

FIG. 5 is a drawing for explaining the operation of the first chip according to the embodiment of FIG. 1, and FIG. 6 is a flowchart for explaining a cache line processing method which is performed by a system level cache according to an embodiment of the present disclosure.

Referring to FIG. 5, the first chip 100 according to the present embodiment may include the plurality of processors 110 and 120, the memory 130, the system level cache 140, and the directory cache 150. The plurality of processors 110 and 120 may include the internal caches 111 and 121.

The internal cache 111 may store the first data whose home node is the first chip 100, and the processor 110 may perform an atomic operation on the first data. The atomic operation may be an operation including an atomic load and an atomic store. The internal cache 111 may set an atomic flag in the state field of the first data.

The internal cache 111 may transmit the first data subjected to the atomic operation to the system level cache 140 based on the cache replacement policy (reference symbol 'S510'). The internal cache 111 may transmit the first data to the system level cache 140 through the bus 160. In an embodiment, the internal cache 111 may include an L1 cache and an L2 cache. In this case, the L1 cache may transmit the first data to the L2 cache based on the cache replacement policy. Further, the L2 cache may transmit the first data to the system level cache 140 based on the cache replacement policy. In other words, the first data may move from the L1 cache to the L2 cache, and from the L2 cache to the system level cache 140. This movement of the first data may be referred to as an eviction operation based on the cache replacement policy.

The system level cache 140 may include the SLC controller 141, and the SLC controller 141 may control the overall operation of the system level cache 140. The system level cache 140 may determine a stash value for the first data. The system level cache 140 may determine whether to transmit the first data to the second chip 200, based on the stash value for the first data. The operation of the system level cache 140 will be described with reference to FIG. 6.

If the system level cache 140 determines to transmit the first data to the second chip 200, the system level cache 140 may transmit the first data to the directory cache 250 of the second chip 200 (reference symbol 'S520'). In other words, the first data may move from the system level cache 140 to the directory cache 250. This movement of the first data may be referred to as a stashing operation. The system level cache 140 may use the bus 160 to transmit the first data.

In FIG. 5, it has been described that the internal cache 111 performs the atomic operation; however, the present disclosure is not necessarily limited thereto, and the internal cache 121 may be implemented to perform the atomic operation and transmit the data to the system level cache 140.

Referring to FIG. 6, the system level cache 140 may receive a cache line (S610). In other words, the internal cache 111 of the processor 110 may transmit the first data in the form of a cache line to the system level cache 140. A cache line may include a state field, a tag field, and a data field. The state field may contain an exclusive flag, an atomic flag, a read-hit flag, a read-not-hit flag, etc. For example, the internal cache 111 may set the exclusive flag if an atomic load is performed on the cache line. The internal cache 111 may set the atomic flag if an atomic store is performed on the cache line. The read-hit flag, the read-not-hit flag, and so on may be set by the SLC controller 141 or the DRC controller 151.

The system level cache 140 may determine whether the atomic flag has been set in the received cache line (S620). In other words, the system level cache 140 may determine whether an atomic operation has been successfully performed on the cache line received from the internal cache 111. The system level cache 140 may check whether the atomic flag is in the state field of the cache line received from the internal cache 111.

When the atomic flag has been set in the cache line, the system level cache 140 may transmit the cache line to other chips (S630). For example, another chip may refer to a chip other than the first chip 100, and may be the second chip 200. In an embodiment, the system level cache 140 may determine a stash value, and determine whether to transmit the cache line, on the basis of the stash value. The configuration in which the system level cache 140 determines whether to transmit the cache line will be described below with reference to FIG. 7.

The system level cache 140 may process the cache line (S640). When the atomic flag has not been set in the cache line, the system level cache 140 may process the cache line without transmitting the cache line to other chips. Further, even when the atomic flag has been set in the cache line, the system level cache 140 may transmit the cache line to other chips and process the cache line. The system level cache 140 may process the cache line according to instructions from the plurality of processors 110 and 120 or instructions from another chip.

FIG. 7 is a flowchart for explaining a cache line processing method which is performed by a system level cache according to an embodiment of the present disclosure.

Referring to FIG. 7, a cache line processing method which is performed by a system level cache according to an embodiment may further include steps S710 and S720 in addition to the steps of the cache line processing method of FIG. 6. The description of steps S610, S620, S630, and S640 of FIG. 6 can be equally applied to the cache line processing method of FIG. 7.

The system level cache 140 according to the embodiment may performs steps S610 and S620, and determine a stash value for the cache line when the atomic flag has been set in the cache line (S710). The system level cache 140 may manage the stash value of the cache line received from the internal cache 111. For example, the system level cache 140 may store the address and stash value of the cache line. The system level cache 140 may determine a stash value corresponding to the address of the cache line.

The system level cache 140 may determine whether the stash value is larger than a reference value (REF VALUE) (S720). The reference value may be a value which is used to determine whether to transmit the data of one chip to other chips in advance, and may be determined in advance. For example, the system level cache 140 may use a 2-bit saturating counter, and the reference value may be '01'. In other words, when the stash value is '11' or '10', the system level cache 140 may determine that the stash value is larger than the reference value, and when the stash value is '01' or '00', the system level cache 140 may determine that the stash value is not larger than the reference value.

When the stash value is larger than the reference value, the system level cache 140 may transmit the cache line to other chips (S630). When the stash value is not larger than the reference value, the system level cache 140 may process the cache line (S640). In this case, the system level cache 140 may not transmit the cache line to other chips.

In FIG. 7, it has been described that the system level cache 140 determines whether the stash value is larger than the reference value; however, the embodiment is not necessarily limited thereto, and the system level cache 140 may be implemented to determine whether the stash value is larger than or equal to the reference value, or not.

Figure 8:
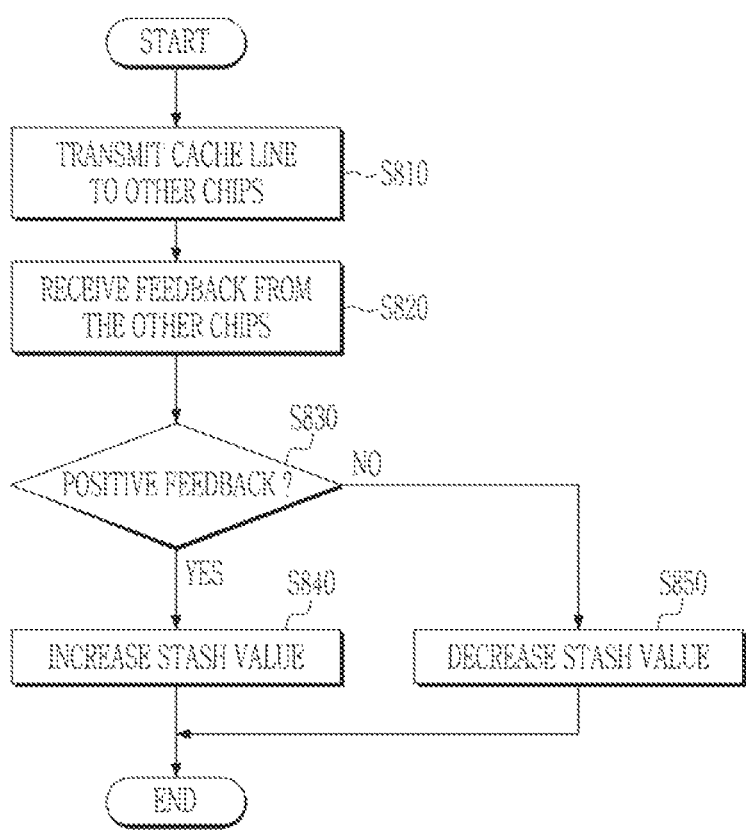
FIG. 8 is a flowchart for explaining a stash value determining method which is performed by a system level cache according to an embodiment of the present disclosure.

FIG. 8 is a flowchart for explaining a stash value determining method which is performed by a system level cache according to an embodiment of the present disclosure.

Referring to FIG. 8, the system level cache may transmit a cache line to other chips (S810). The data of the cache line may be shared data whose home node is a chip where the system level cache is located among the plurality of chips. The system level cache may transmit a cache line to other chips when the stash value of the cache line is larger than the reference value. For example, the system level cache 140 of the first chip 100 may transmit a cache line to the second chip 200. In this case, the cache line may include a state field, a tag field, and a data field, and the state field may contain information on the exclusive flag, the atomic flag, the read-hit flag, the read-not-hit flag, etc.

The system level cache may receive feedback from other chips (S820). The feedback may be about whether the transmitted cache line has been read, and may include positive feedback or negative feedback. Positive feedback corresponds to the read-hit flag, and negative feedback corresponds to the read-not-hit flag. The feedback is received as an electrical signal, and is not particularly limited in terms of the type of signal. As an example, the second chip 200 may transmit feedback in the form of a request message, a response message, etc, to the system level cache 140 of the first chip 100. In this case, the request message or the response message may include the read-hit flag or read-not-hit flag. As another example, the second chip 200 may set the read-hit flag or the read-not-hit flag in the state field of a cache line, and transmit the cache line with the flag to the system level cache 140 of the first chip 100.

The system level cache may determine whether the feedback is positive feedback (S830). For example, when the system level cache receives the read-hit flags from other chips, it may determine that the feedback is positive feedback. When the system level cache receives the read-not-hit flags from other chips, it may determine that the feedback is negative feedback. The system level cache may receive the read-hit flags or the read-not-hit flags through message or cache lines.

When the feedback is positive feedback, the system level cache may increment the stash value of the cache line (S840). In other words, the system level cache may increase the stash value. The system level cache may set '0' as the initial stash value. The system level cache may use counters to increment or decrement a stash value. In some embodiments, when the feedback is positive feedback, the system level cache may maintain the stash value.

When the feedback is not positive feedback, the system level cache may decrement the stash value of the cache line (S850). In other words, the system level cache may decrease the stash value. For example, in a first case in which the cache line had not been read in the remote node until the cache line was evicted to the home node, the system level cache may decrement the stash value of the cache line. In a second case in which the remote node had not read the cache line and received an invalidation message, the system level cache may decrement the stash value of the cache line. In a third case in which the remote node transmitted a write request to the home node, the system level cache may decrement the stash value of the cache line. The system level cache may perform a weak decrement on the stash value in the first case and the third case, and perform a strong decrement on the stash value in the second case. The strong decrement may include an operation of decrementing the stash value by 2 or more, or an operation of resetting the stash value. The weak decrement may include an operation of decrementing the stash value by 1. In an embodiment, when the system level cache receives negative feedback corresponding to the first case or the third case from all remote nodes, it may perform the weak decrement on the stash value. When the system level cache receives positive feedback from any one remote node, it may not decrement the stash value of the cache line, or it may increment the stash value of the cache line.

Figure 9:
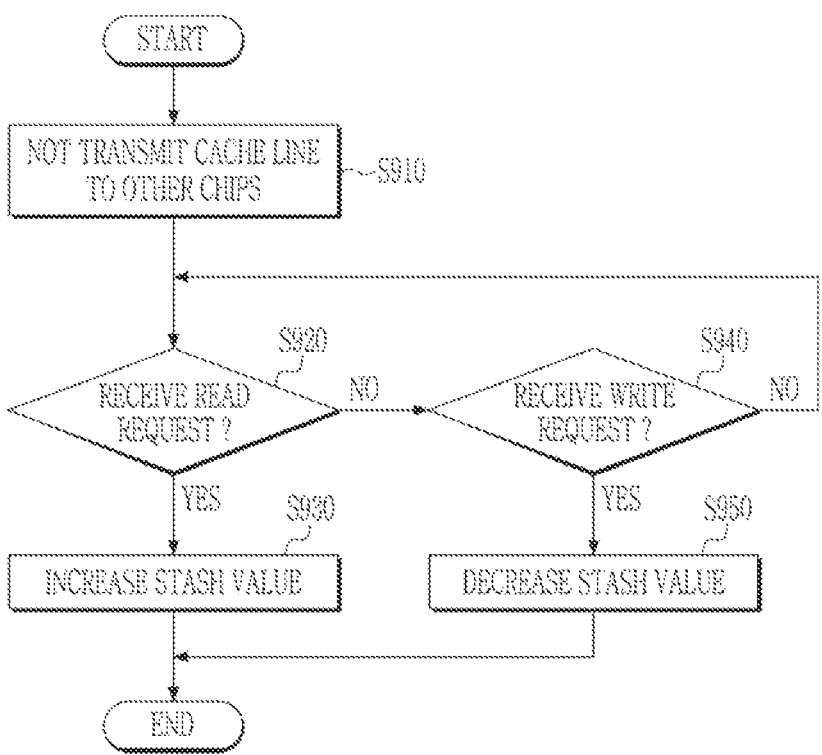
FIG. 9 is a flowchart for explaining a stash value determining method which is performed by a system level cache according to an embodiment of the present disclosure.

FIG. 9 is a flowchart for explaining a stash value determining method which is performed by a system level cache according to an embodiment of the present disclosure.

Referring to FIG. 9, the system level cache may not transmit a cache line to other chips (S910). The cache line may be shared data whose home node is the first chip 100 equipped with the system level cache 140 among the plurality of chips constituting the NUMA system. When the stash value of the cache line is not larger than the reference value, the system level cache may not transmit the cache line to other chips. In some embodiments, step S910 may be omitted.

The system level cache may detect whether any read request for the cache line has been received from other chips (S920). Other chips which are remote nodes may transmit a read request to the home node to access the shared data in the home node. For example, the second chip 200 which is a remote node among the plurality of chips may transmit a read request for the cache line which has the shared data, to the first chip 100 which is the home node. The first chip 100 may receive the read request before evicting the cache line.

When the system level cache has received a read request for the cache line from other chips, it may increment the stash value of the cache line (S930). For example, the system level cache may use a counter to increment the stash value. The counter may increment the stash value by one bit.

When the system level cache has not received any read request for the cache line from other chips, it may detect whether any write request has been received from other chips (S930). For example, a third chip of the plurality of chips may transmit a write request for the cache line to the first chip 100. The third chip may perform an atomic operation (e.g., an atomic load and an atomic store) on the cache line. The first chip 100 may transmit an invalidation signal to the other chips of the plurality of chips except for the third chip. In other words, when one chip of the plurality of chips has performed an atomic operation on the shared data, the first chip 100 may transmit an invalidation signal to the other chips for data consistency. More specifically, if one chip of the plurality of chips performs an atomic operation on the shared data, the first chip 100 might send an invalidation signal to the other chips to maintain data consistency.

When the system level cache has not received any write request from other chips, it may detect whether any read request for the cache line has been received from other chips (S920).

When the system level cache has received a write request from other chips, it may decrement the stash value of the cache line (S950). In other words, when the system level cache has not received any read request from the other chips among the plurality of chips except for the first chip 100, and has received a write request from another chip, it may decrement the stash value. In some embodiments, when the system level cache receives a write request from another chip, it may maintain the stash value.

Figure 10:
FIG. 10 is a drawing for explaining the operation of a system level cache according to an embodiment of the present disclosure.

FIG. 10 is a drawing for explaining the operation of a system level cache according to an embodiment of the present disclosure.

Referring to FIG. 10, a system level cache according to an embodiment may manage a stash table 1000 corresponding to a plurality of stored cache lines. The stash table 1000 may store addresses ADDR_1 to ADDR_T and stash values STV_1 to STV_T of the plurality of cache lines. Here, T may be an integer greater than 1. In an embodiment, the system level cache may index entries related to the addresses ADDR_1 to ADDR_T of the plurality of cache lines, using a hash function. In this case, the system level cache may store the entries and stash values STV_1 to STV_T of the plurality of cache lines in the stash table 1000.

The system level cache may update the stash values STV_1 to STV_T based on feedback received from other chips. For example, the system level cache may receive positive feedback or negative feedback. When the system level cache receives positive feedback, it may increment the stash values STV_1 to STV_T, and when the system level cache receives negative feedback, it may decrement the stash values STV_1 to STV_T. In some embodiments, the system level cache may maintain the stash values STV_1 to STV_T in response to positive feedback or negative feedback.

The system level cache may check the stash value of a cache line subjected to an atomic operation (for example, the first cache line). For example, the first cache line may have the first address ADDR_1 and the first stash value STV_1. The system level cache may use the stash table 1000 to check the first stash value STV_1.

The system level cache may determine whether the first stash value STV_1 is larger than the reference value. When the first stash value STV_1 is larger than the reference value, the system level cache may transmit the first cache line to other chips. When the first stash value STV_1 is not larger than the reference value, the system level cache may not transmit the first cache line to other chips.

The system level cache may receive feedback on the first cache line from other chips, and update the first stash value STV_1. For example, when the system level cache transmits the first cache line to other chips, and receives a read-hit flag, it may increment the first stash value STV_1. When the system level cache transmits the first cache line to other chips, and receives a read-not-hit flag, it may decrement the first stash value STV_1. Further, when the system level cache does not transmit the first cache line to other chips, and receives a read request, it may increment the first stash value STV_1. When the system level cache does not transmit the first cache line to other chips, and does not receive any read request, it may decrement or maintain the first stash value STV_1.

Figure 11:
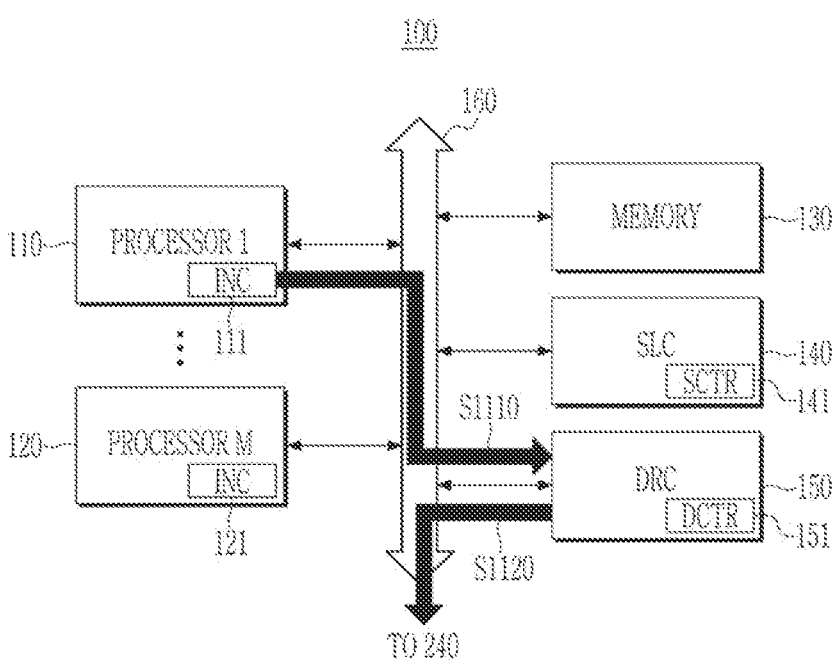
FIG. 11 is a drawing for explaining the operation of the first chip according to an embodiment of the present disclosure.

FIG. 11 is a drawing for explaining the operation of the first chip according to an embodiment of the present disclosure.

Referring to FIG. 11, a first chip 100 according to the present embodiment may include the plurality of processors 110 and 120, the memory 130, the system level cache 140, and the directory cache 150. The plurality of processors 110 and 120 may include the internal caches 111 and 121.

The first chip 100 may receive the second data. The first chip 100 is a remote node for the second data, and the second chip 200 which is the home node of the second data may transmit the second data to the first chip 100. The internal cache 111 may perform an atomic operation on the second data. The atomic operation may be an operation including an atomic load and an atomic store. The internal cache 111 may set an atomic flag in the state field of the second data.

The internal cache 111 may transmit the second data subjected to the atomic operation to the directory cache 150 based on the cache replacement policy (reference symbol 'S1110'). The internal cache 111 may transmit the second data to the directory cache 150 through the bus 160. In an embodiment, the internal cache 111 may include an L1 cache and an L2 cache. In this case, the L1 cache may transmit the second data to the L2 cache based on the cache replacement policy. Further, the L2 cache may transmit the second data to the directory cache 150 based on the cache replacement policy. In other words, the second data may move from the L1 cache to the L2 cache, and then from the L2 cache to the directory cache 150. The movement of the second data may be referred to as an eviction operation according to the cache replacement policy.

When the directory cache 150 receives the second data, it may determine whether the second data is data subjected to the atomic operation. The directory cache 150 may include the DRC controller 151, and the DRC controller 151 may control the overall operation of the directory cache 150. The directory cache 150 may check whether the atomic flag has been set, based on the state field of the second data. When the second data is data subjected to the atomic operation, the directory cache 150 may transmit the second data to the system level cache 240 of the second chip 200 which is the home node of the second data (S1120). The directory cache 150 may use the bus 160 to transmit the second data to the system level cache 240.

In FIG. 11, it has been described that the internal cache 111 performs the atomic operation; however, the present disclosure is not limited thereto, and the internal cache 121 may be implemented to perform the atomic operation and transmit the data to the directory cache 150.

Figure 12:
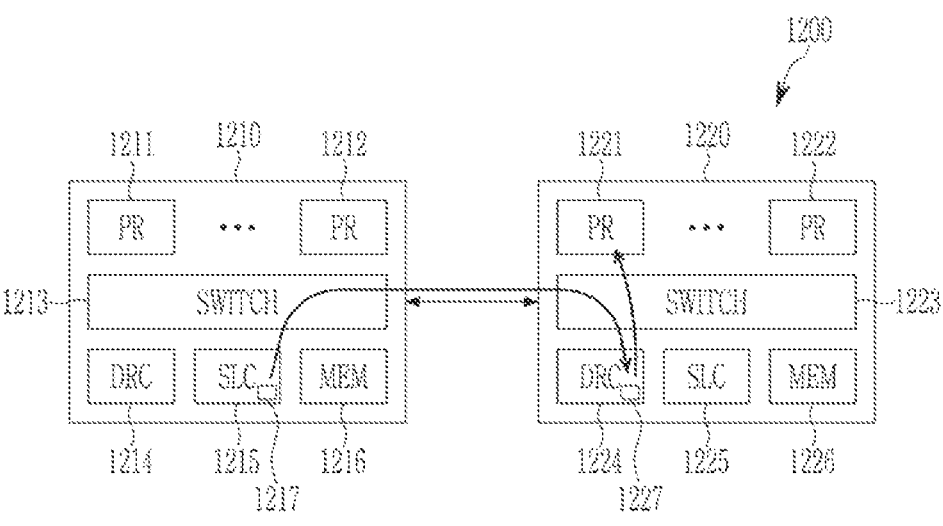
FIG. 12 is a drawing for explaining the operation of a computing system according to an embodiment of the present disclosure.
Figure 13:
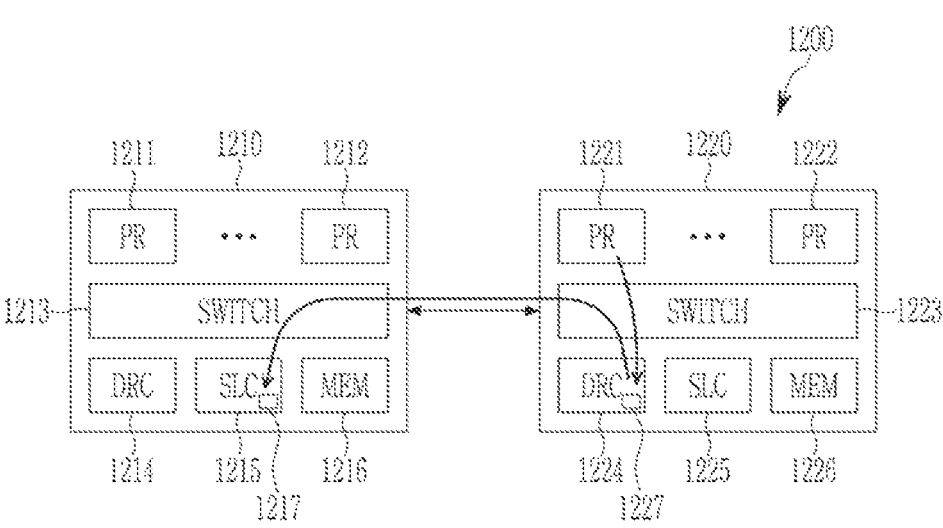
FIG. 13 is a drawing for explaining the operation of the computing system according to an embodiment of the present disclosure.

FIG. 12 and FIG. 13 are drawings for explaining the operation of a computing system according to an embodiment of the present disclosure.

Referring to FIG. 12, a computing system 1200 according to an embodiment may include a first chip 1210 and a second chip 1220. In FIG. 12 and FIG. 13, the paths indicated by arrows may be paths through which data shared by the first chip 1210 and the second chip 1220 moves. The first chip 1210 may include a plurality of processors (PR) 1211 and 1212, a switch 1213, a directory cache (DRC) 1214, a system level cache (SLC) 1215, and a memory (MEM) 1216. The second chip 1220 may include a plurality of processors (PR) 1221 and 1222, a switch 1223, a directory cache (DRC) 1224, a system level cache (SLC) 1225, and a memory (MEM) 1226. The description made with reference to FIG. 1, FIG. 2, and FIG. 4 may be applied to the components of the first chip 1210 and the second chip 1220. For example, the description of the processors 110 and 120 may be applied to the processors 1211 and 1212. The switches 1213 and 1223 may function as interfaces to enable communication between the first chip 1210 and the second chip 1220 and between the components in each chip. The switches 1213 and 1223 may set paths for electrical signals to travel.

The system level cache 1215 of the first chip 1210 may determine whether to transmit data shared by the first chip 1210 and the second chip 1220 to the second chip 1220 in advance. The operation of transmitting in advance may refer to an operation of the first chip 1210 transmitting shared data without a request from the second chip 1220. In this case, the first chip 1210 may be the home node of the shared data, and the second chip 1220 may be a remote node of the shared data. The system level cache 1215 may receive the shared data evicted from the internal cache of the processor 1211 or 1212.

The system level cache 1215 may include an SLC controller 1217. The SLC controller 1217 may determine whether to transmit, based on the atomic flag and stash value of the shared data. For example, the SLC controller 1217 may check whether an atomic flag has been set in the state field of the shared data. The internal cache of the processor 1211 or 1212 may perform an atomic operation on the shared data. When the internal cache successfully performs the atomic operation, it may set an atomic flag in the state field of the shared data.

When the atomic flag has been set in the shared data, the SLC controller 1217 may check the stash value of the shared data. For example, the SLC controller 1217 may check the stash value based a stash table managed by the SLC controller 1217. When the stash value is larger than the reference value, the SLC controller 1217 may transmit the shared data to the second chip 1220.

The system level cache 1215 may use the switch 1213 to transmit the shared data to the directory cache 1224 of the second chip 1220. The shared data that the first chip 1210 transmitted to the second chip 1220 in advance may be read by the plurality of processors 1221 and 1222 of the second chip 1220, or may not be read.

The processor 1221 may transmit a read request for the shared data to the directory cache 1224. The processor 1221 may include an L1 cache and an L2 cache as internal caches. The processor 1221 may transmit a read request for the shared data to the L1 cache, and the L1 cache may transmit a read request for the shared data to the L2 cache. The L2 cache may transmit a read request for the shared data to the directory cache 1224.

The directory cache 1224 may include a DRC controller 1227. The DRC controller 1227 may receive the read request for the shared data from the L2 cache. The DRC controller 1227 may set a read-hit flag in the state field of the shared data in response to the read request. In some embodiments, the DRC controller 1227 may set a read-hit flag in the state field of the shared data, and then transmit a signal including the read-hit flag to the system level cache 1215. The SLC controller 1217 of the system level cache 1215 may update the stash value of the shared data based on the read-hit flag. For example, the SLC controller 1217 may maintain or increment the stash value of the shared data.

The DRC controller 1227 may transmit the shared data to the processor 1221. For example, the processor 1221 may transmit the shared data to the L2 cache, and the L2 cache may transmit the shared data to the L1 cache. The processor 1221 may read the shared data in the L1 cache.

Referring to FIG. 13, the processor 1221 may transmit the shared data to the directory cache 1224. For example, the shared data in the L1 cache may be evicted to the L2 cache, and the shared data in the L2 cache may be evicted to the directory cache 1224. The L1 cache and the L2 cache may perform the eviction operations based on the cache replacement policy.

When the DRC controller 1227 receives the shared data from the processor 1221, it may determine whether an atomic operation was performed on the shared data. For example, the DRC controller 1227 may check whether an atomic flag has been set in the state field of the shared data. When an atomic operation has been performed on the shared data, the DRC controller 1227 may transmit the shared data to the system level cache 1215 of the first chip 1210, using the switch 1223. When an atomic operation has not been performed on the shared data, the DRC controller 1227 may transmit a signal including a read-hit flag to the system level cache 1215, using the switch 1223. On the basis of the read-hit flag, the SLC controller 1217 of the system level cache 1215 may update the stash value of the shared data.

In FIG. 12 and FIG. 13, a configuration has been described in which the processor 1221 reads shared data in the directory cache 1224, and the DRC controller 1227 sets a read-hit flag; however, the present disclosure is not necessarily limited thereto, and the processor 1221 may not read the shared data in the directory cache 1224, and the DRC controller 1227 may set a read-not-hit flag. For example, when the shared data is not read until the DRC controller 1227 receives an invalidation message from the first chip 1210, the DRC controller 1227 may set a read-not-hit flag. When the DRC controller 1227 receives an invalidation message from the first chip 1210, it may transmit a read-not-hit flag to the first chip 1210 in response to the invalidation message.

Figure 14:
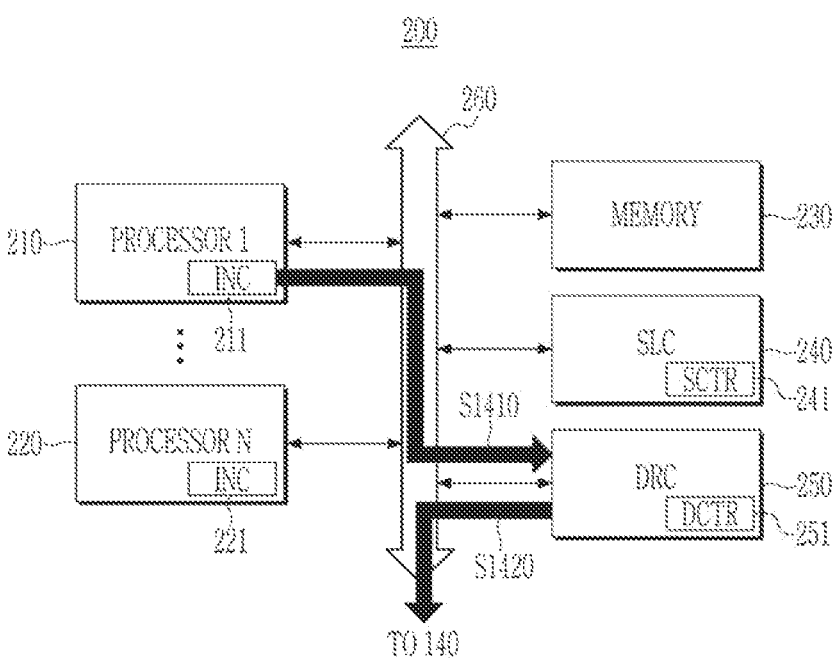
FIG. 14 is a drawing for explaining the operation of a second chip according to an embodiment of the present disclosure.

FIG. 14 is a drawing for explaining the operation of a second chip according to an embodiment of the present disclosure.

Referring to FIG. 14, a second chip 200 according to an embodiment may include a plurality of processors 210 and 220, a memory 230, a system level cache 240, and a directory cache 250. The plurality of processors 210 and 220 may include internal caches 211 and 221.

The internal cache 211 may transmit first data whose remote node is the second chip 200 to the directory cache 250 based on the cache replacement policy (S1410). The internal cache 211 may transmit the first data to the directory cache 250 through the bus 260. In an embodiment, the internal cache 211 may include an L1 cache and an L2 cache. In this case, the L1 cache may transmit the first data to the L2 cache based on the cache replacement policy. Further, the L2 cache may transmit the first data to the directory cache 250 based on the cache replacement policy. In other words, the first data may move from the L1 cache to the L2 cache, and from the L2 cache to the directory cache 250. The movement of the first data may be referred to as an eviction operation according to the cache replacement policy.

When the directory cache 250 receives the first data, it may determine whether the first data is data subjected to the atomic operation. The directory cache 250 may include a DRC controller 251, and the DRC controller 251 may control the overall operation of the directory cache 250. The directory cache 250 may check whether the atomic flag has been set, based on the state field of the first data. When the first data is data subjected to the atomic operation, the directory cache 250 may transmit the first data to the system level cache 140 of the first chip 100 which is the home node (S1420). The directory cache 250 may use the bus 260 to transmit the first data.

In FIG. 14, it has been described that the internal cache 211 performs the atomic operation; however, the present disclosure is not limited thereto, and the internal cache 221 may be implemented to perform the atomic operation and transmit the data to the directory cache 250.

Figure 15:
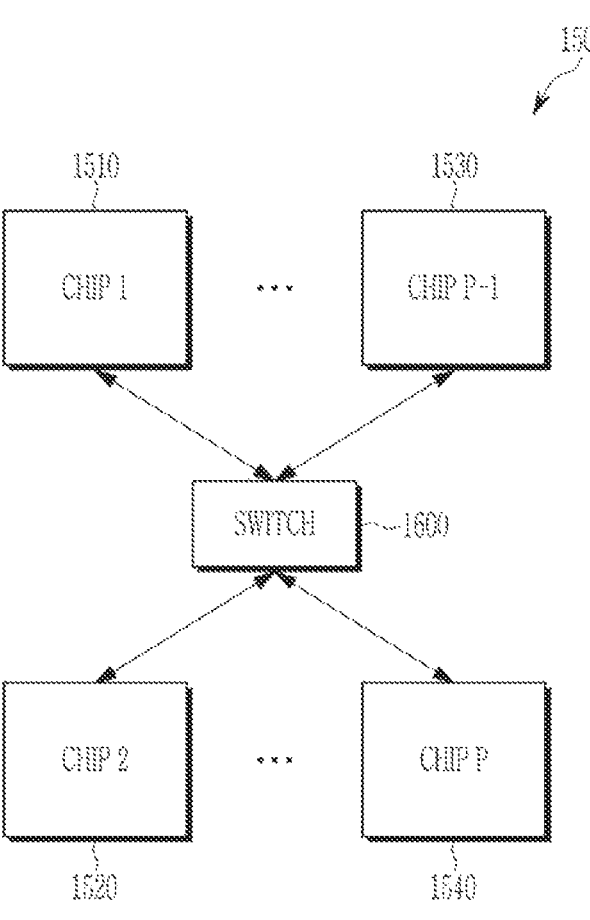
FIG. 15 is a schematic block diagram of a multi-chip computing system according to an embodiment of the present disclosure.

FIG. 15 is a schematic block diagram of a multi-chip computing system according to an embodiment of the present disclosure.

Referring to FIG. 15, a computing system 1500 according to an embodiment may be a multi-chip computing system. For example, the computing system 1500 may include first to P-th chips 1510, 1520, 1530 and 1540. Here, P may be an integer greater than 2. The first to P-th chips 1510 to 1540 are multi-processor chips, and may be system on chips (SOCs). However, the present disclosure is not necessarily limited thereto, and at least one of the first to P-th chips 1510 to 1540 may be implemented as a single processor chip. The first to P-th chips 1510 to 1540 may perform communication with one another through a switch 1600.

The first to P-th chips 1510 to 1540 may share data. In this case, the first chip 1510 may be a home node which manages the shared data, and the second to P-th chips 1520 to 1540 may be remote nodes. Since the first chip 1510 manages the shared data, the latency which is required for the second to P-th chips 1520 to 1540 to access the shared data through the switch 1600 may be longer than the latency which is required for the first chip 1510 to access the shared data. As the number of times the remote nodes access the data in the home node increases, the performance of the computing system 1500 may decrease. The computing system 1500 may be a non-uniform memory access (NUMA) system.

In an embodiment, the first chip 1510 may perform an atomic operation on the shared data. In an embodiment, any one chip of the second to P-th chips 1520 to 1540 (for example, the P-th chip 1540) may perform an atomic operation on the shared data, and transmit the shared data subjected to the atomic operation, to the first chip 1510. The first chip 1510 may detect shared data on which an atomic operation has been successfully performed, and check the stash value of the shared data. When the stash value is larger than the reference value, the first chip 1510 may transmit the shared data to the second to P-th chips 1520 to 1540 in advance.

The second to P-th chips 1520 to 1540 may receive the shared data from the first chip 1510 without requesting. When the second to P-th chips 1520 to 1540 read the shared data, they may set a read-hit flag in the state field of the shared data. In an embodiment, the second to P-th chips 1520 to 1540 may transmit signals including the read-hit flags to the first chip 1510. In an embodiment, when the second to P-th chips 1520 to 1540 evict the shared data to the first chip 1510, they may transmit the read-hit flags along with the shared data to the first chip 1510. Depending on the state of the read-hit flags, the first chip 1510 may increment the stash value of the shared data.

When the second to P-th chips 1520 to 1540 do not read the shared data, they may set a read-not-hit flag in the state field of the shared data. For example, the second chip 1520 may transmit a write request to the first chip 1510. In response to the write request, the first chip 1510 may generate an invalidation message. The first chip 1510 may transmit the invalidation message to the (P−1)-th chip 1530 and the P-th chip 1540 such that the second chip 1520 can update the shared data. Since the (P–1)-th chip 1530 and the P-th chip 1540 have not read the shared data until receiving the invalidation message, they may set a read-not-hit flag in the state field of the shared data. The (P–1)-th chip 1530 and the P-th chip 1540 may transmit the read-not-hit flags to the first chip 1510 in response to the invalidation message. Depending on the state of the read-not-hit flags, the first chip 1510 may decrement the stash value of the shared data. Further, in response to the write request from the second chip 1520, the first chip 1510 may decrement the stash value of the shared data.

The first chip 1510 may update the stash value based on the flags received from the second to P-th chips 1520 to 1540. The first chip 1510 may increment the stash value by one bit based on the read-hit flags, and decrement the stash value by one bit based on the read-not-hit flags. In an embodiment, the first chip 1510 may determine whether all of the second to P-th chips 1520 to 1540 have not read the shared data or if there is a system on chip in which the shared data has been invalidated without being read among the second to P-th chips 1520 to 1540, or not, based on the flags. According to the result of the determination, the first chip 1510 may update the stash value of the shared data. For example, when all of the second to P-th chips 1520 to 1540 have not read the shared data or there is a system on chip in which the shared data has been invalidated without being read among the second to P-th chips 1520 to 1540, the first chip 1510 may decrement the stash value of the shared data.

In an embodiment, the first chip 1510 may calculate a stash offset by subtracting the number of chips which have not read the shared data among the (P–1) number of chips from the number of chips which had read the shared data. On the basis of the stash offset, the first chip 1510 may update the stash value. For example, the first chip 1510 may receive read-hit flags from five chips, and receive read-not-hit flags from three chips. The first chip 1510 may determine 2 bits as the stash offset, and increment the stash value by 2 bits.

Figure 16:
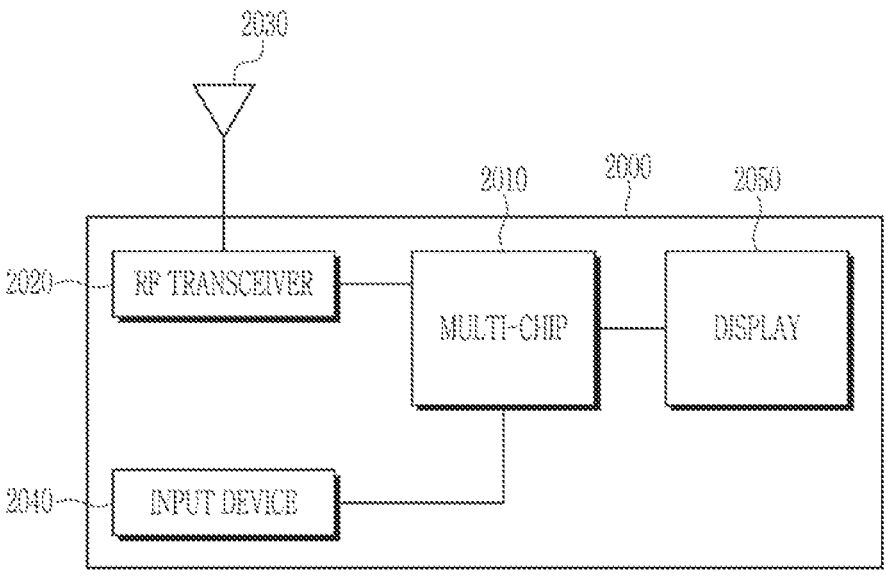
FIG. 16 is a block diagram of a mobile device according to an embodiment of the present disclosure.

FIG. 16 is a block diagram of a mobile device according to an embodiment of the present disclosure.

Referring to FIG. 16, a mobile device 2000 according to an embodiment may include a multi-chip system 2010, a radio frequency (RF) transceiver 2020, an antenna 2030, an input device 2040, and a display 2050.

The multi-chip system 2010 may be a non-uniform memory access (NUMA) system, and include a plurality of chips sharing data. The plurality of chips may be system on chips (SOCs). For the multi-chip system 2010, the description made with reference to FIG. 1 to FIG. 15 may be equally applied. For example, the home node of shared data may determine whether to transmit the shared data to remote nodes in advance, based on the stash value of the shared data. The home node may receive feedback about an operation of transmitting in advance, or feedback about an operation of not transmitting in advance, from remote nodes. The home node may update the stash value based on the feedback. The home node may transmit shared data to remote nodes in advance, such that the latency required for the remote nodes to read the shared data decreases.

The RF transceiver 2020 may transmit and receive wireless signals through the antenna 2030. For example, the RF transceiver 2020 may receive wireless signals through the antenna 2030, and convert the wireless signals into signals which can be processed by the multi-chip system 2010.

Therefore, the multi-chip system 2010 may process signals output from the RF transceiver 2020, and transmit the processed signals to the display 2050. Further, the RF transceiver 2020 may convert signals output from the multi-chip system 2010 into wireless signals, and output the converted wireless signals to external devices through the antenna 2030.

The input device 2040 is a device for inputting control signals for controlling the operation of the multi-chip system 2010 or data to be processed by the multi-chip system 2010, and may be implemented as a pointing device such as a touch pad and a computer mouse, a keypad, or a keyboard.

Figure 17:
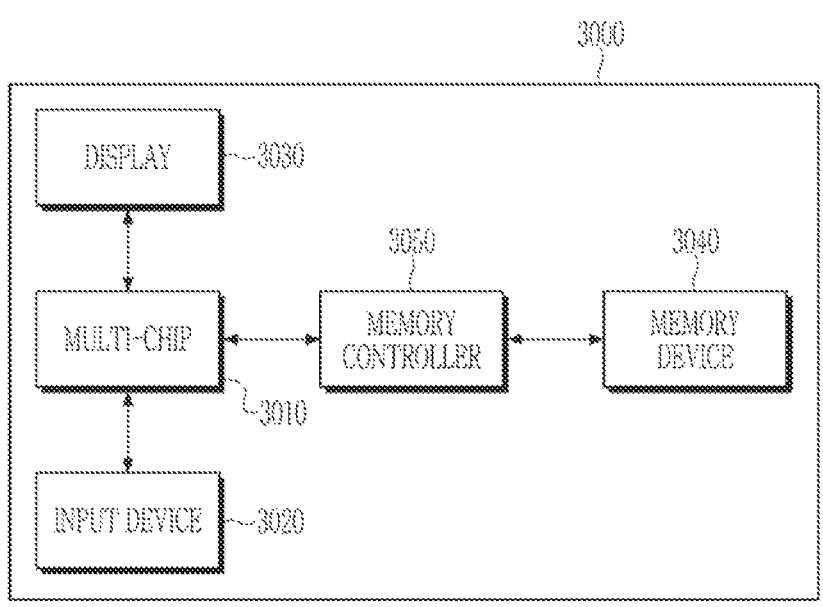
FIG. 17 is a block diagram of an electronic device according to an embodiment of the present disclosure.

FIG. 17 is a block diagram of an electronic device according to an embodiment of the present disclosure.

Referring to FIG. 17, an electronic device 3000 according to an embodiment may be implemented as a PC, a data server, a laptop computer, an automotive electronic component, or a portable device.

The electronic device 3000 may include a multi-chip system 3010, an input device 3020, a display 3030, a memory device 3040, and a memory controller 3050 capable of controlling the data processing operation of the memory device 3040.

The multi-chip system 3010 may be a non-uniform memory access (NUMA) system, and include a plurality of chips sharing data. The plurality of chips may be system on chips (SOCs). For the multi-chip system 3010, the description made with reference to FIG. 1 to FIG. 15 may be equally applied. For example, the home node of shared data may determine whether to transmit the shared data to remote nodes in advance, based on the stash value of the shared data. The home node may receive feedback about an operation of transmitting in advance, or feedback about an operation of not transmitting in advance, from remote nodes. The home node may update the stash value based on the feedback. The home node may transmit shared data to remote nodes in advance, such that the latency required for the remote nodes to read the shared data decreases.

The multi-chip system 3010 may receive data input through the input device 3020. Data stored in the memory device 3040 may be disposed on the display 3030 according to the control and processing operations of the multi-chip system 3010. For example, the input device 3020 may be implemented as a pointing device such as a touch pad or a computer mouse, a keypad, or a keyboard. The multi-chip system 3010 may control the overall operation of the electronic device 3000, and control the operation of the memory controller 3050.

The memory controller 3050 capable of controlling the operation of the memory device 3040 may be implemented as a part of the multi-chip system 3010, and may also be implemented separately from the multi-chip system 3010.

In some embodiments, each of the components described with reference to FIG. 1 and FIG. 17, or a combination of two or more components may be implemented as a digital circuit, a programmable or non-programmable logic device or array, an application specific integrated circuit (ASIC), etc.

While the present disclosure has been described in connection with a plurality of embodiments, it is to be understood that the present disclosure is not limited to the disclosed embodiments. On the contrary, it is intended to cover various modifications and equivalent arrangements included within the spirit and scope of the present disclosure as set forth in the appended claims.

What is claimed is:

1. A system on chip comprising:
   a plurality of processors;
   a system level cache memory that is shared by the plurality of processors; and a cache controller that transmits first data to another chip if an atomic operation has been performed on the first data, when the system level cache memory receives the first data from at least one of the plurality of processors, wherein when the atomic operation is performed on the first data, the cache controller transmits the first data to the another chip, based on a stash value for the first data, and when the stash value of the first data is larger than a reference value, the cache controller transmits the first data to the another chip.

2. The system on chip of claim 1, wherein the system on chip is a home node that manages the first data, and the another chip is a remote node that accesses the first data.

3. The system on chip of claim 2, wherein the cache controller transmits the first data to a directory cache memory of the another chip.

4. The system on chip of claim 1, wherein the at least one of the plurality of processors sets an atomic flag in a state field of the first data when the atomic operation is performed on the first data, and the cache controller determines whether the atomic operation has been performed on the first data, based on the atomic flag of the first data.

5. The system on chip of claim 1, wherein the cache controller determines the stash value based on a signal related to the first data received from the another chip.

6. The system on chip of claim 5, wherein the cache controller performs the following:

incrementing the stash value when the signal related to the first data received from the another chip is a positive signal; and decrementing the stash value when the signal related to the first data received from the another chip is a negative signal.

7. The system on chip of claim 6, wherein the positive signal includes a read-hit flag indicating that the another chip has read the first data, and the negative signal includes a read-not-hit flag indicating that the another chip has not read the first data.

8. A computing system comprising:

a first chip that acquires an address of first data subjected to an atomic operation by the first chip, determines a stash value corresponding to the address, and transmits the first data to a second chip in response to completion of the atomic operation when the stash value is greater than a reference value; and the second chip that shares the first data with the first chip, and transmits information on whether the first data has been read, to the first chip, in response to the receipt of the first data.

9. The computing system of claim 8, wherein the second chip performs the following:

recording information on whether the first data has been read, in a state field of the first data; and setting a read-hit flag in a first field of the state field when the first data is read, and setting a read-not-hit flag in a second field of state field when the first data is not read.

10. The computing system of claim 9, wherein the second chip sets the read-not-hit flag in the second field of the state field, if the second chip has not read the first data until evicting the first data or receiving an invalidation message from the first chip.

11. The computing system of claim 10, further comprising:

a third chip that shares the first data with the first chip and the second chip, wherein the first chip transmits the invalidation message to the second chip in response to the receipt of a write request from the third chip, and updates the stash value for the first data based on the read-hit flag or the read-not-hit flag.

12. The computing system of claim 8, wherein the second chip records information on whether the first data has been read, in a state field of the first data, and if the first data is evicted from the second chip, the first chip updates the stash value of the first data based on the state field.

13. The computing system of claim 8, further comprising:

a third chip that shares the first data with the first chip and the second chip, wherein the first data is subjected to the atomic operation by the first chip, or is subjected to an atomic operation by the third chip.

14. A stashing method of a system on chip comprising:

acquiring an address of a cache line subjected to an atomic operation;

incrementing a stash value when the cache line has been read by other system on chips, and decrementing the stash value when the cache line has not been read by the other system on chips; and determining whether to stash the cache line based on the address and the stash value.

15. The stashing method of claim 14, further comprising:

indexing an entry related to the address of the cache line, using a hash function, wherein determining whether to stash the cache line includes determining whether to stash the cache line, based on the entry and the stash value.

16. The stashing method of claim 14, wherein determining whether to stash the cache line includes stashing the cache line when the stash value is larger than a reference value, and not stashing the cache line when the stash value is not larger than the reference value.

17. The stashing method of claim 14, wherein acquiring the address includes not acquiring an address when the cache line is data in a remote node and acquiring an address when the cache line is data in a home node.

18. The stashing method of claim 14, wherein incrementing a stash value when the cache line has been read by the other system on chips, and decrementing the stash value when the cache line has not been read by the other system on chips include the following:

stashing the cache line in the other system on chips and receiving response signals from the other chips;

determining whether all of the other system on chips have not read the cache line or there is a system on chip in which the cache line has been invalidated without being read among the other system on chips, or not, based the response signals; and a step of updating the stash value based on the result of the determination.

* * * * *